United States Patent [19]

Emerson, Jr.

[11] Patent Number: 4,879,964
[45] Date of Patent: Nov. 14, 1989

[54] AIR BRAKE ADJUSTMENT MARKER

[76] Inventor: Donald L. Emerson, Jr., 24805 SW. Gage Rd., Wilsonville, Oreg. 97070

[21] Appl. No.: 242,659

[22] Filed: Sep. 12, 1988

[51] Int. Cl.⁴ .................. B60Q 11/00; F16D 66/02
[52] U.S. Cl. ........................... 116/28 R; 116/208; 116/215; 188/1.11
[58] Field of Search ................ 116/173–175, 116/203, 208, 215, 212, 28 R, DIG. 34; 188/1.11; 340/52 A; 24/298, 299

[56] References Cited

U.S. PATENT DOCUMENTS

| | | | |
|---|---|---|---|
| 1,750,588 | 3/1930 | Gilmore | 24/299 |
| 2,350,637 | 6/1944 | Pittman | 116/215 |
| 2,952,057 | 9/1960 | Lassiter | 116/173 |
| 3,356,188 | 12/1967 | Goldman et al. | 188/79.5 |
| 3,822,669 | 7/1974 | Schrag | 116/303 |
| 3,854,417 | 12/1974 | MacDonnell et al. | 105/1 A |
| 3,982,413 | 9/1976 | Stone et al. | 116/28 R |
| 4,279,214 | 7/1981 | Thorn | 116/208 |
| 4,432,120 | 2/1984 | Sherman, Jr. et al. | 24/299 |
| 4,642,603 | 2/1987 | Martinez, Jr. | 340/52 B |
| 4,776,438 | 10/1988 | Schandelmeier | 188/1.11 |
| 4,800,991 | 1/1989 | Miller | 188/1.11 |

FOREIGN PATENT DOCUMENTS 3119125  12/1982  Fed. Rep. of Germany ..... 188/1.11

Primary Examiner—William A. Cuchlinski, Jr.
Assistant Examiner—W. Morris Worth
Attorney, Agent, or Firm—Henderson & Sturm

[57] ABSTRACT

An air brake adjustment marker for use on a vehicle having an air brake system attached to the undercarriage of a vehicle. The air brake system incudes an air supply, an air canister connected to the air supply and attached to the undercarriage. The air brake system further includes members movable with respect to the undercarriage. The movable members include a push rod extending from the air canister that moves between a retracted position to a first extended position and to a second over-extended position. A brake mechanism is operably connected to and movable by the push rod. The adjustment marker incudes a chain attached to the push rod and having a predetermined length corresponding to the first extended position. A snap is attached to one end of the chain and a clamp is attached to the other end. An indicator flag is attached to the chain near the snap so that when the push rod is in an over-extended position, the snap will release and drop downwardly allowing the indicator flag to drop by gravity and alert the operator of the vehicle that the air brake system requires attention.

18 Claims, 2 Drawing Sheets

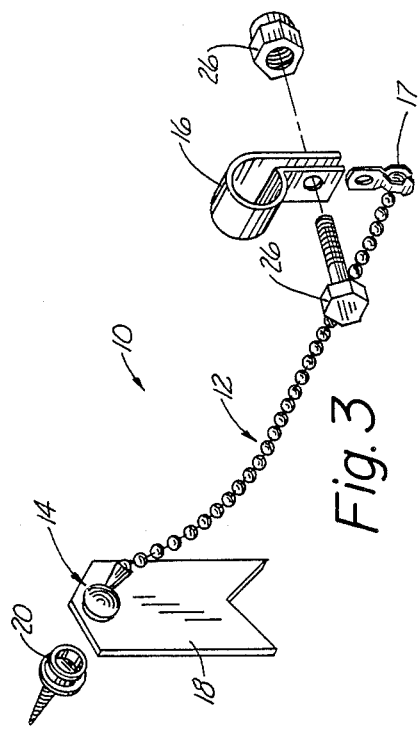
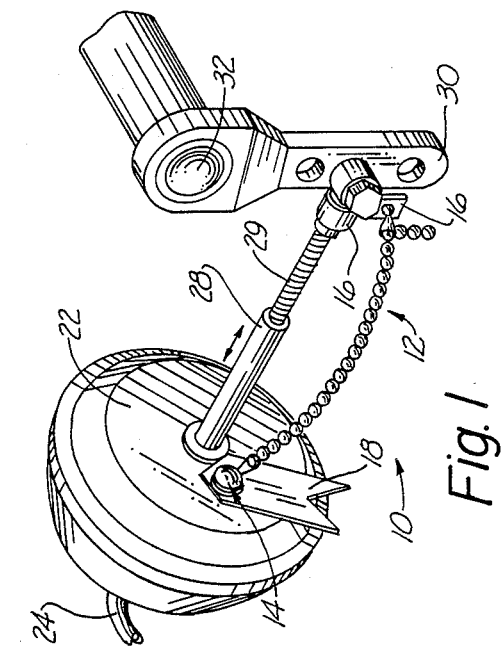
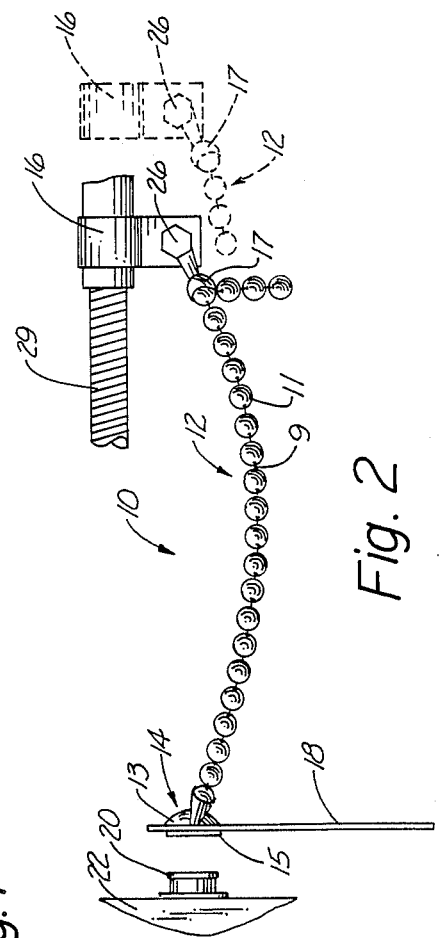

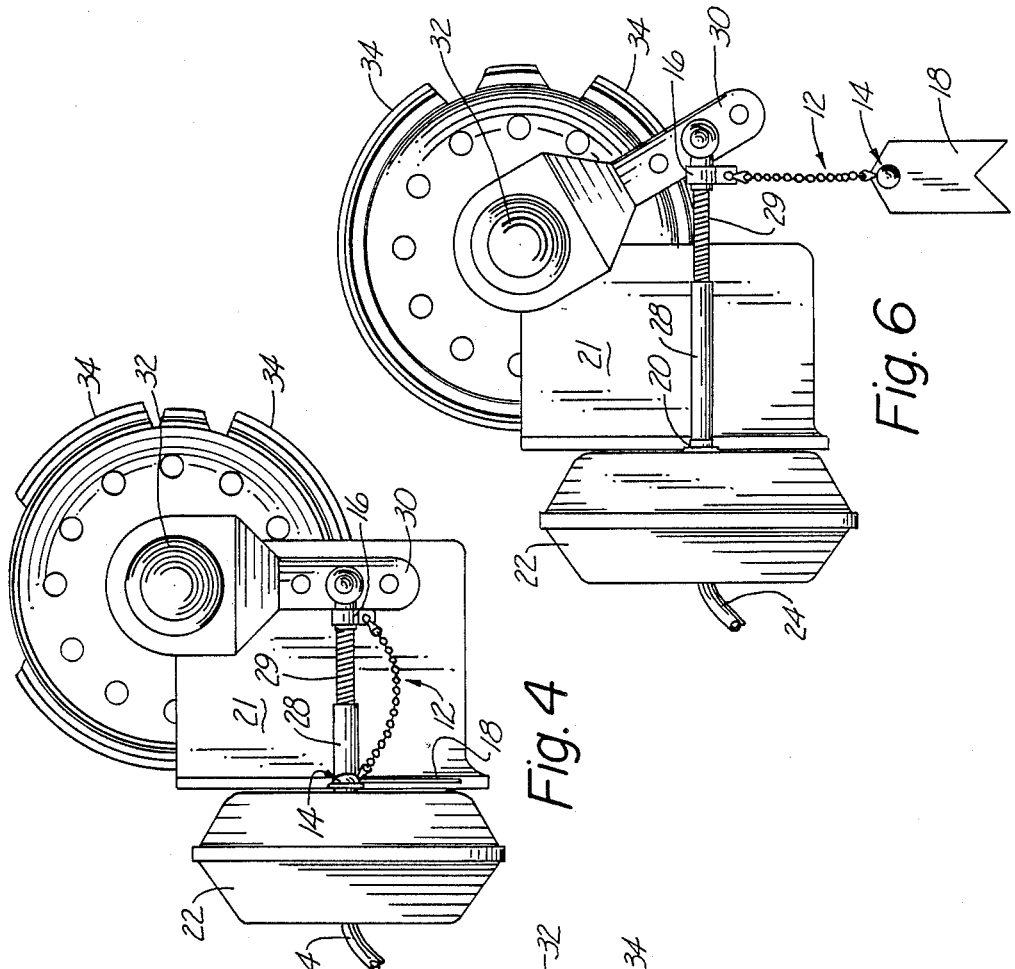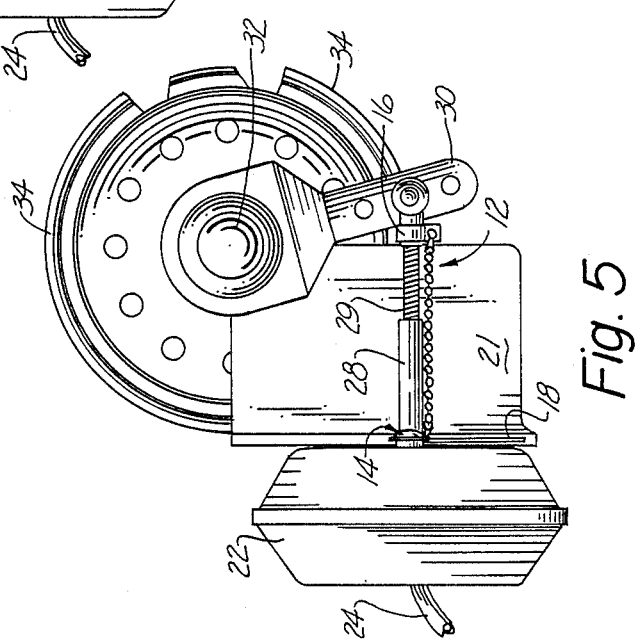

AIR BRAKE ADJUSTMENT MARKER

TECHNICAL FIELD

This invention relates to air brake adjustment markers and more particularly to an air brake adjustment marker that will alert a vehicle operator when an air brake system requires attention.

BACKGROUND ART

Many known prior art devices have been used to indicate brake wear on a braking mechanism, such as a pointer and a dial secured to a cam shaft and a lever, respectively. Attachment of this device was costly and could only be provided as original equipment. Timing of the pointer with the dial for a correct reading was difficult. Other indicators for brake wear are sensors and slack adjusters. Sensors are subject to failure and breakage. Slack adjusters can lose teeth and permit over travel of the push rod which in turn harms the braking mechanism.

Those concerned with these and other problems recognize the need for an improved air brake adjustment marker.

DISCLOSURE OF THE INVENTION

The present invention provides an air brake adjustment marker for use on a vehicle having an air brake system attached to the undercarriage of a vehicle. The air brake system includes an air supply, an air canister connected to the air supply and attached to the undercarriage. The air brake system further includes members movable with respect to the undercarriage. The movable members include a push rod extending from the air canister that moves between a retracted position to a first extended position and to a second overextended position. A brake mechanism is operably connected to and movable by the push rod. The adjustment marker includes a chain attached to the push rod and having a predetermined length corresponding to the first extended position. A snap is attached to one end of the chain and a clamp is attached to the other end. An indicator flag is attached to the chain near the snap so that when the push rod is in an over-extended position, the snap will release and drop downwardly allowing the indicator flag to drop by gravity and alert the operator of the vehicle that the air brake system requires attention.

An object of the present invention is the provision of an improved air brake adjustment marker that will warn vehicle operators or inspectors that the push rod is moving an excessive distance due to poor adjustment or worn brake pads.

Another object of the present invention is to provide an improved air brake adjustment marker that is quickly and easily installed on a vehicle.

A further object of the invention is the provision of an improved air brake adjustment marker that has a visual indicator flag that will hang loose and warn the vehicle operator of poor adjustment or worn brake pads when the air canister push rod over extends.

Still another object of the present invention is to provide a chain that can be easily adjusted to allow truck or fleet owners to set the indicator flag at whatever point desired to reset brake adjustment.

BREIF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the air brake adjustment marker in its installed position;

FIG. 2 is a side elevational view of the present invention showing the indicator flag and snap pulled away from the air can and the clamp device installed on a push rod and showing an alternate adjustment of the chain links in dashed lines;

FIG. 3 is an exploded perspective view of the present invention showing the parts thereof;

FIG. 4 is a side elevational view showing the invention attached to an air brake system when the brakes are off and the push rod is in a retracted position;

FIG. 5 is a side elevational view similar to FIG. 4 showing the invention when the push rod is in an extended position where the brakes are in adjustment and the indicator flag is secured in a up position; and FIG. 6 is a side elevational view similar to FIG. 5, but showing the situation where the brakes are out of adjustment, the push rod is greatly extended, and the indicator flag is in a dropped position to alert the vehicle operator of the possible need for brake maintenance.

BEST MODE FOR CARRYING OUT THE INVENTION

Referring now to the drawings, wherein like reference numerals designate identical or corresponding parts throughout the several views, FIG. 1 shows the air brake adjustment marker (10) of the present invention. The air brake adjustment marker (10) includes a chain or flexible member (12) attached at one end to a snap or releasable securement means (14) and at the other end to a clamp (16). An indicator flag (18) is attached to the chain (12) near the snap (14).

Referring to FIG. 2 it can be seen that the chain (12) is made of a series of round beads (11) separated by spacers (9). The clamp (16) carries a socket (17) that matingly receives one of the beads (11) and provides for an adjustment of the length of the chain (12). Further, it can be seen that the snap (14) comprises a female head portion (13) and a female receiving portion (15). The indicator flag (18) is securely fastened between the female head portion (13) and the female receiving portion (15) of the snap (14). A male portion (20) is threadably attached to a stationary member, such as the air canister (22).

FIGS. 4, 5 and 6 depict the air brake adjustment marker in use in conjunction with an air brake system attached to the undercarriage (21) of a vehicle such as a semi-trailer (not shown). The air brake system includes an air canister (22) operably connected to an air supply (24). A push rod (28) extends from the air canister (24) and is movable from a retracted position (FIG. 4) to a first extended position (FIG. 5) and to a second over-extended position (FIG. 6). The end of the push rod (28) carries a threaded extension (29) that is attached at one of several positions on the slack adjuster (30). Extension of the push rod (28) causes the slack adjuster (30) to exert torque on shaft (32) and expand the brake pads (34).

Referring first to FIG. 4, the adjustment marker (10) is first secured to an air canister (22) by attaching the male receiving portion (20) of the snap (14) to the air canister (22). A maintenance person or one skilled in the adjustment of brakes on a particular vehicle determines the adjustment needed to provide appropriate slack in the chain (12). The other end of the chain (12) is then secured by the clamp (16) to the end of the threaded extension (29) by means of a nut and bolt arrangement (26). A flexible indicator flag (18) is either pre-installed between the female head portion (13) and the female receiving portion (15), or the installation can be done at this time. The female receiving portion (15) of the snap (14) is then snapped onto the male portion (20). As depicted in FIG. 4, the adjustment marker (10) is shown with the brakes off and the push rod (28) in a retracted position.

Referring now to FIG. 5, the push rod (28) is extended and no slack remains in the chain (12). However, the tension being exerted by the chain (12) is not sufficient to cause the snap (14) to release since the brakes are in adjustment.

FIG. 6 depicts the situation where the brake pads (34) are excessively worn and the brakes are out of adjustment. The is condition allows the push rod (28) to move to the over extended position and apply sufficient force through the chain (12) to cause the snap (14) to release. The indicator flag (18) then drops downwardly by the force of gravity to alert the vehicle operator to check the brake system.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. An air brake adjustment marker for use on a vehicle having an air brake system attached to the undercarriage of said vehicle, said air brake system including an air supply, an air canister operably connected to the air supply and attached to the undercarriage such that it is stationary with respect thereto, said air brake system further including members movable with respect to said undercarriage said movable members including a push rod extending from said air canister and movable from a retracted position to a first extended position and to a second over-extended position, and a braking mechanism including a slack adjuster, and a shaft operably connected to a movable by said push rod, the improvement comprising:

a flexible member having two ends, said flexible member having a predetermined length corresponding to said first extended position;

a releasable securement means attached at an attachment point and interconnecting one end of said flexible member and one of a stationary member attached to said vehicle undercarriage or a movable member of the air brake system, said releasable securement means including a two part snap having a male portion and a corresponding female portion, wherein said corresponding female portion has a female head portion and a female receiving portion;

a clamp interconnecting the other end of said flexible member and the other of said stationary member attached to said vehicle undercarriage or said movable member of the air brake system; and an indicator flag attached to said flexible member near said releasable securement means, wherein when said push rod is in its second over-extended position, said releasable securement means will release from said attachment point and drop downwardly allowing said indicator flag to drop by gravity and alert an operator of said vehicle that said air brake system requires attention.

2. The marker as described in claim 1 wherein said flexible member is a chain.

3. The marker as described in claim 2 wherein said chain includes a predetermined number of round beads, each said round bead being separated by a spacing member, and wherein said clamp includes a socket to matingly receive one of said beads.

4. The marker as described in claim 1 wherein said male portion of said two part snap further includes a threaded body portion for attachment to a stationary member or a movable member.

5. The marker as described in claim 1 wherein said clamp further includes a nut and bolt arrangement for securing one end of said flexible member to either a stationary member or a movable member.

6. The marker as described in claim 1 wherein said indicator flag is of a semi-rigid material.

7. The marker as described in claim 6 wherein said indicator flag is attached between said female head portion and said female receiving portion of said releasable securement means so that when said push rod is over-extended said indicator flag will drop to alert the vehicle operator of required attention for the air brake system.

8. The marker as described in claim 3 wherein said chain is adjustable in length and allows for adjustment of the travel of said push rod.

9. An air brake adjustment marker for use on a vehicle having an air brake system attached to the undercarriage of said vehicle, said air brake system including an air supply, an air canister operably connected to the air supply and attached to the undercarriage such that it is stationary with respect thereto, said air brake system further including a push rod extending from said air canister and movable from a retracted position to a first extended position and to a second over-extended position, and a braking mechanism operably connected to and movable by said push rod, the improvement comprising:

an adjustable length flexible member having two ends, said flexible member having a predetermined adjusted length corresponding to said first extended position;

a reusable, releasable securement means attached at an attachment point and interconnecting one end of said flexible member and one of said air canister or said push rod;

a clamp interconnecting the other end of said flexible member and the other of said air canister or said push rod;

said clamp having adjustment means to permit adjustment of the length of said flexible member; and an indicator flag attached to said flexible member near said releasable securement means, whereby when said push rod is in its second over-extended position, said releasable securement means will release from said attachment point and drop downwardly allowing said indicator flag to drop by gravity and alert an operator of said vehicle that said air brake system requires attention.

10. The marker as described in claim 9 wherein said adjustable flexible member is a chain.

11. The marker as described in claim 10 wherein said chain includes a predetermined number of round beads, each said round bead being separated by a spacing member, and wherein said adjustment means of said clamp includes a socket to matingly receive one of said beads.

12. The marker as described in claim 9 wherein said releasable securement means is a two part snap, said two part snap having a male portion and a corresponding female portion.

13. The marker as described in claim 12 wherein said corresponding female portion of said releasabe securement means has a head portion and a female receiving portion.

14. The marker as described in claim 12 wherein said male portion of said two part snap further includes a threaded body portion for attachment to a stationary member or a movable member.

15. The marker as described in claim 9 wherein said clamp further includes a nut and bolt arrangement for securing one end of said flexible member to either a stationary member or a movable member.

16. The marker as described in claim 9 wherein said indicator flag is of a semi-rigid material.

17. The marker as described in claim 16 wherein said indicator flag is attached between a female head portion and a female receiving portion of said releasable securement means so that when said push rod is over-extended said indicator flag will drop to alert the vehicle operator of required attention for the air brake system.

18. The marker as described in claim 11 wherein said chain is adjustable in length and allows for adjustment of the travel of said push rod.

* * * * *